United States Patent [19]
Ichimura

[11] Patent Number: 5,878,200
[45] Date of Patent: *Mar. 2, 1999

[54] DOCUMENT PROCESSING APPARATUS FOR DISPLAYING INPUTTED DATA IN A PRINT AREA BASED UPON THE SIZE OF A RECORDING MATERIAL AND THE REPRINTED DATA PRINTED THEREON

[75] Inventor: Hideshi Ichimura, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 972,966

[22] Filed: Nov. 19, 1997

Related U.S. Application Data

[63] Continuation of Ser. No. 377,685, Jan. 25, 1995, abandoned, which is a continuation of Ser. No. 899,126, Jun. 18, 1992, abandoned, which is a continuation of Ser. No. 301,952, Jan. 26, 1989, abandoned.

[30] Foreign Application Priority Data

Jan. 30, 1988 [JP] Japan .................................... 63-20805

[51] Int. Cl.$^6$ .................................................. G06F 7/00
[52] U.S. Cl. .......................................... 395/117; 395/111
[58] Field of Search .................................. 395/115, 117, 395/111, 101

[56] References Cited

U.S. PATENT DOCUMENTS

| | | | |
|---|---|---|---|
| 3,829,855 | 8/1974 | Kolpek | 364/900 |
| 3,872,462 | 3/1975 | Lemelson | 340/734 |
| 4,028,681 | 6/1977 | Vittorelli | 364/900 |
| 4,240,758 | 12/1980 | Acosta | 400/279 |
| 4,284,362 | 8/1981 | Jackson | 364/900 |
| 4,357,680 | 11/1982 | Greek, Jr. et al. | 364/900 |
| 4,403,301 | 9/1983 | Fessel | 364/900 |
| 4,491,933 | 1/1985 | Wisin et al. | 364/900 |
| 4,546,449 | 10/1985 | Masaki | 364/900 |
| 4,553,206 | 11/1985 | Smutek | 364/300 |
| 4,558,965 | 12/1985 | Ueda et al. | 400/144.2 |
| 4,596,478 | 6/1986 | De George | 235/432 |
| 4,608,662 | 8/1986 | Watanabe et al. | 364/900 |
| 4,615,631 | 10/1986 | Ueda et al. | 400/705.1 |
| 4,725,158 | 2/1988 | Ueda et al. | 400/63 |
| 4,734,782 | 3/1988 | Maeshima | 358/280 |
| 4,735,515 | 4/1988 | Ueda et al. | 400/109 |
| 4,755,955 | 7/1988 | Kimura | 364/518 |
| 4,785,413 | 11/1988 | Atsumi | 364/900 |
| 4,807,020 | 2/1989 | Hirosawa | 358/75 |
| 4,809,220 | 2/1989 | Carlson | 364/900 |
| 4,813,010 | 3/1989 | Okamoto et al. | 364/900 |
| 4,813,077 | 3/1989 | Woods | 382/61 |
| 4,829,474 | 5/1989 | Ikawa | 364/900 |
| 4,846,593 | 7/1989 | Ueda et al. | 400/157 |
| 4,858,171 | 8/1989 | Furusawa | 364/900 |
| 4,863,298 | 9/1989 | Takahashi | 400/279 |
| 4,880,325 | 11/1989 | Ueda et al. | 400/249 |
| 5,075,788 | 12/1991 | Funada | 358/458 |
| 5,129,053 | 7/1992 | Makihara | 395/149 |

FOREIGN PATENT DOCUMENTS

| | | |
|---|---|---|
| 0101032 | 2/1984 | European Pat. Off. . |
| 57-76969 | 5/1982 | Japan . |
| 62-60674 | 3/1987 | Japan . |

*Primary Examiner*—Eric Coleman
*Attorney, Agent, or Firm*—Fitzpatrick, Cella, Harper & Scinto

[57] ABSTRACT

A document processing apparatus includes a keyboard for inputting data, a first memory for storing the data input by the keyboard, an image reader for reading printed data on recording material, a second memory for storing the printed data read by the image reader, a controller for setting a print area of the recording material in accordance with the print data stored in the second memory, and a display screen for displaying the data stored in the first memory in the print area set by the controller.

34 Claims, 10 Drawing Sheets

FIG. 4

| | PERSONAL HISTORY | DATE Y M D | |
|---|---|---|---|
| PHOTO | KANA | M / F | |
| | NAME | DATE OF BIRTH Y M D | |
| PRESENT ADDRESS | | | |
| LEGAL RESIDENCE | | | |

| DATE Y M | CAREER (EDUCATION / BUSINESS) |
|---|---|
| | |
| | |
| | |
| | |
| | |

| SPECIAL ABILITY |
|---|
| |

FIG. 7

| | | | | | |
|---|---|---|---|---|---|
| | | PERSONAL HISTORY | DATE | Y | M |

| PHOTO | KANA | やまだ たろう | | M/F | |
| --- | --- | --- | --- | --- | --- |
| | NAME | YAMADA TAROH | | DATE OF BIRTH | |
| | | | | Y M D | |

| PRESENT ADDRESS | TOKYO, CHIYODA-KU, |
| --- | --- |
| LEGAL RESIDENCE | KANAGAWA-KEN, ODAWARA |

| DATE Y M | CAREER (EDUCATION / BUSINESS) |
| --- | --- |

YAMADA　TAROH

TOKYO , CHIYODA-KU ,

KANAGAWA-KEN , ODAWARA

DOCUMENT PROCESSING APPARATUS FOR DISPLAYING INPUTTED DATA IN A PRINT AREA BASED UPON THE SIZE OF A RECORDING MATERIAL AND THE REPRINTED DATA PRINTED THEREON

This application is a continuation of application Ser. No. 08/377,685 filed Jan. 25, 1995, now abandoned, which is a continuation of application Ser. No. 07/899,126, filed Jun. 18, 1992, now abandoned, which is a continuation of application Ser. No. 07/301,952 file Jan. 26, 1989, now abandoned.

BACKGROUND OF THE INVENTION

1. Field of the Invention

The present invention relates to a document processing apparatus, e.g., a wordprocessor.

2. Related Background Art

In a recent document processing apparatus such as a wordprocessor, when characters, symbols, figures, and the like are printed on a blank recording paper sheet having a predetermined size (e.g., A4 size), they can be easily printed since the apparatus has a predetermined standard format. That is, the wordprocessor prestores the standard format, for example, for an A4-size recording paper sheet, in which a top margin=25 mm, a bottom margin=20 mm, left and right margins=25 mm, the number of characters per line=40, and the number of lines per page=30. For this reason, as long as a document is edited or characters, symbols, and the like are printed using the standard format, an operator need only select default values to desirably print data on a recording paper sheet.

However, when a recording paper sheet does not match the standard format, when a recording paper sheet has a size different from that used for printing, or when a format such as a frame is logically printed on a recording sheet, the size or print start position of the recording sheet must be measured, and default values must be changed based on the measurement results.

When a format wherein characters or a frame are already printed is used, a plurality of tabs or indentations must be set in order to discontinuously print characters or symbols. In this case, a document format setting error tends to occur, and very often only after several errors, a desired print result can be obtained.

SUMMARY OF THE INVENTION

The present invention has been made in consideration of the above situation and has as its object to provide a document processing apparatus which is free from the conventional problems and can print characters, symbols, or the like at a predetermined position regardless of the size of a recording paper sheet, and the positions of printed characters or a frame.

It is another object of the present invention to provide a document processing apparatus which is controlled such that printed data on a recording material is fetched, a print area is set based on the fetched content, and characters are printed in the print area, and which can print data on the basis of a complicated format with a very simple operation.

It is still another object of the present invention to provide a document processing apparatus which does not require setting of a format such as margins, tabs, indentations in a normal edit printing mode, and can eliminate operation errors.

BRIEF DESCRIPTION OF THE DRAWINGS

FIG. 4 is a plan view showing an already printed recording paper sheet;

FIG. 7 is a plan view showing an example wherein data is printed on the already printed recording paper sheet shown in FIG. 4;

FIG. 9 is a plan view showing a case wherein only characters are printed on a blank recording paper sheet.

DETAILED DESCRIPTION OF THE PREFERRED EMBODIMENT

An embodiment of the present invention will now be described in detail with reference to the accompanying drawings.

Figure 1:
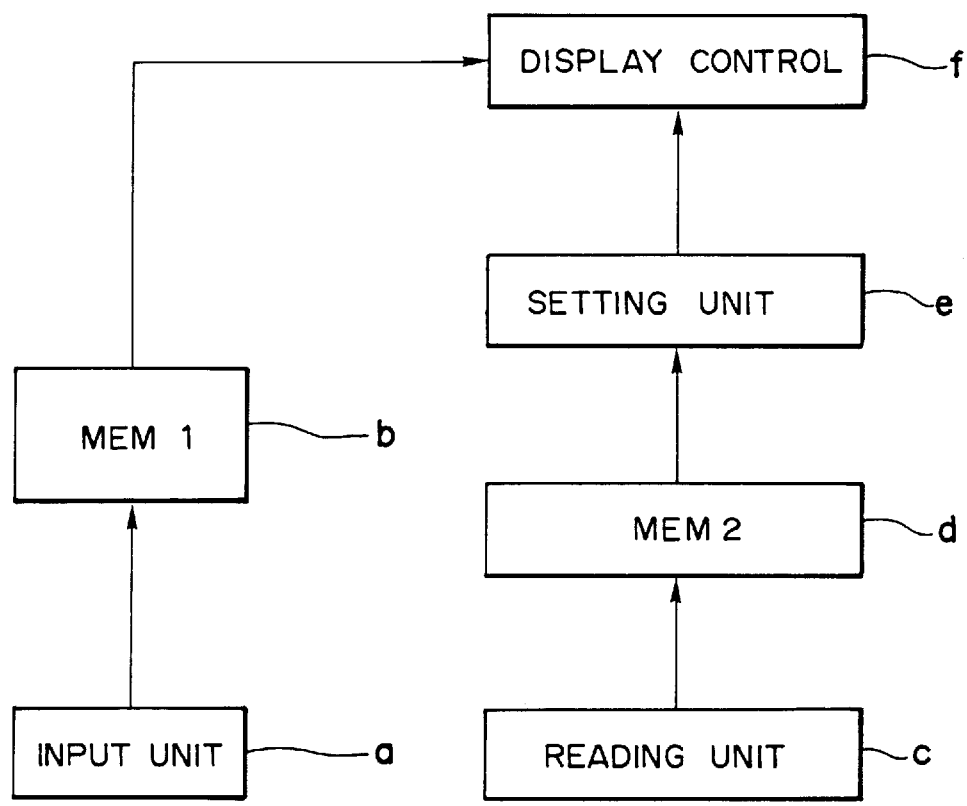
FIG. 1 is a block diagram showing a basic arrangement of an embodiment of the present invention.

FIG. 1 is a block diagram showing the basic arrangement of the present invention. The basic arrangement includes an input unit a for inputting data, a first memory (MEM 1) b for storing the data input by the input unit a, a reading unit c for reading the size of a recording material and print data such as printed characters, symbols, figures, and the like, a second memory (MEM 2) d for storing the print data read by the reading unit c, a setting unit e for setting a print area of the recording material, and a display controller f for displaying the data stored in the MEM 1 b in the print area set by the setting unit e.

Figure 2:
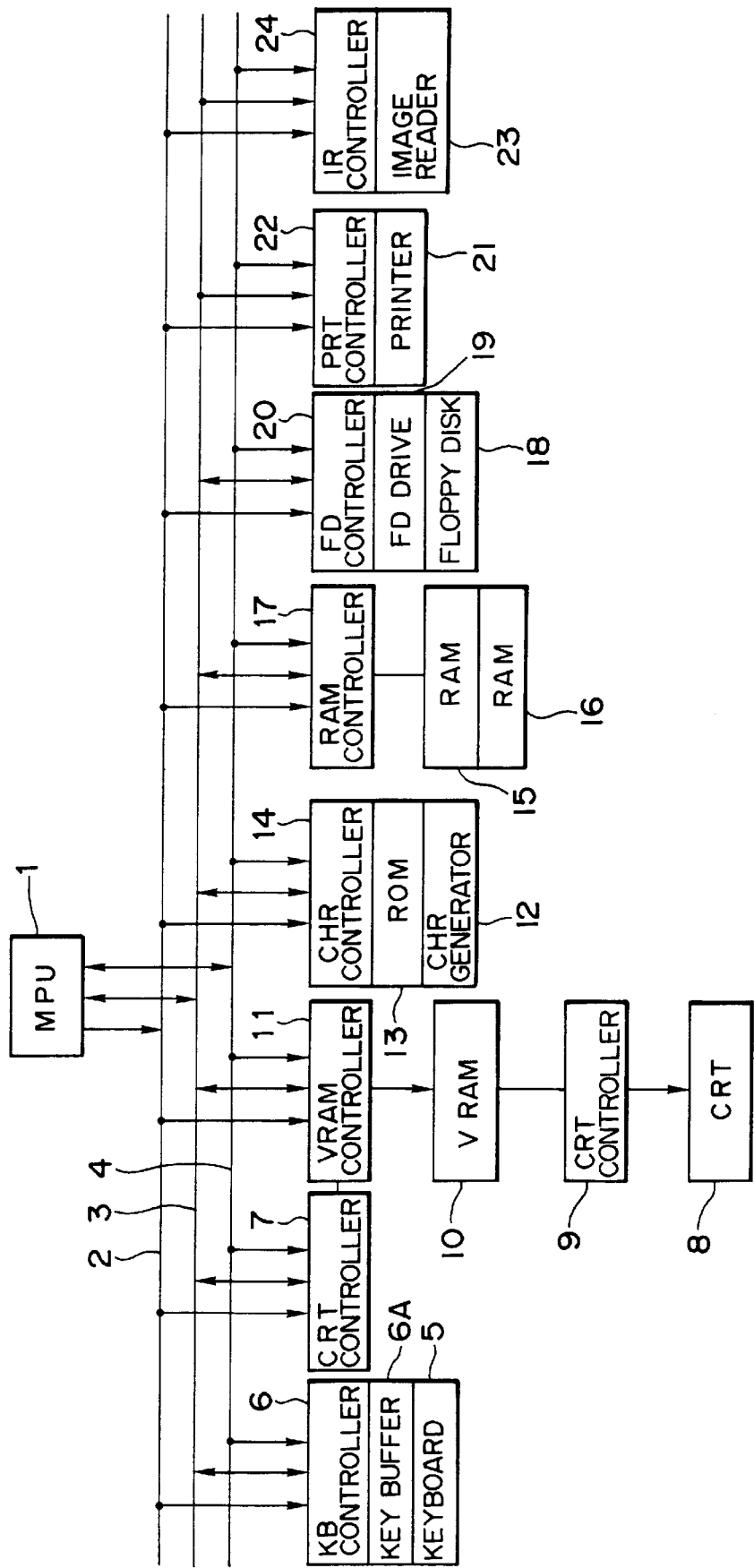
FIG. 2 is a block diagram showing an arrangement of a document processing apparatus according to the embodiment of the present invention.

FIG. 2 shows an arrangement of a document processing apparatus according to the present invention. The document processing apparatus shown in FIG. 2 includes a processing unit (microprocessor; MPU) 1, an address bus 2 for designating addresses of I/O memories, a bidirectional data bus 3 used for transferring various data, and a control bus 4 used for accepting read, write, and interrupt commands for memories, and transferring timing data of data setting, and the like.

A keyboard 5 includes letter keys, hiragana (Japanese letter) keys, numeric keys, a read key, an input key, an edit key, a store key, a print key, and the like. The keyboard 5 is connected to a keyboard controller 6 through a key buffer 6A and is controlled thereby. Data input at the keyboard 5 is encoded by the keyboard controller 6, and an interrupt signal is sent onto the control bus 4. Note that decoded key data is temporarily stored in the key buffer 6A, and is encoded by the controller 6 in accordance with an access by the MPU 1 to be read in the MPU 1.

A CRT controller 7 controls a CRT display 8, a display controller 9, a video memory (VRAM) 10, and a video memory (VRAM) controller 11. The display controller 9 processes a pattern signal from the VRAM 10, and supplies the processed output to the CRT display 8 to output the display pattern.

The VRAM 10 stores characters, lines, and figures to be displayed on the CRT display 8, and its storage content has a one-to-one correspondence with a display on the CRT display 8. The VRAM 10 repetitively outputs a video pattern in accordance with a display instruction from the CRT controller 7. The VRAM controller 11 controls the above-mentioned refresh cycle for the CRT display in accordance with an instruction from the CRT controller 7, and also controls data write/read access from the MPU 1.

A character (CHR) generator 12 stores character patterns of characters to be displayed on the CRT display 8. Data is read out from the CHR generator 12 according to a request from the MPU 1 and is written in the VRAM 10 to be displayed on the display 8.

Figure 8:
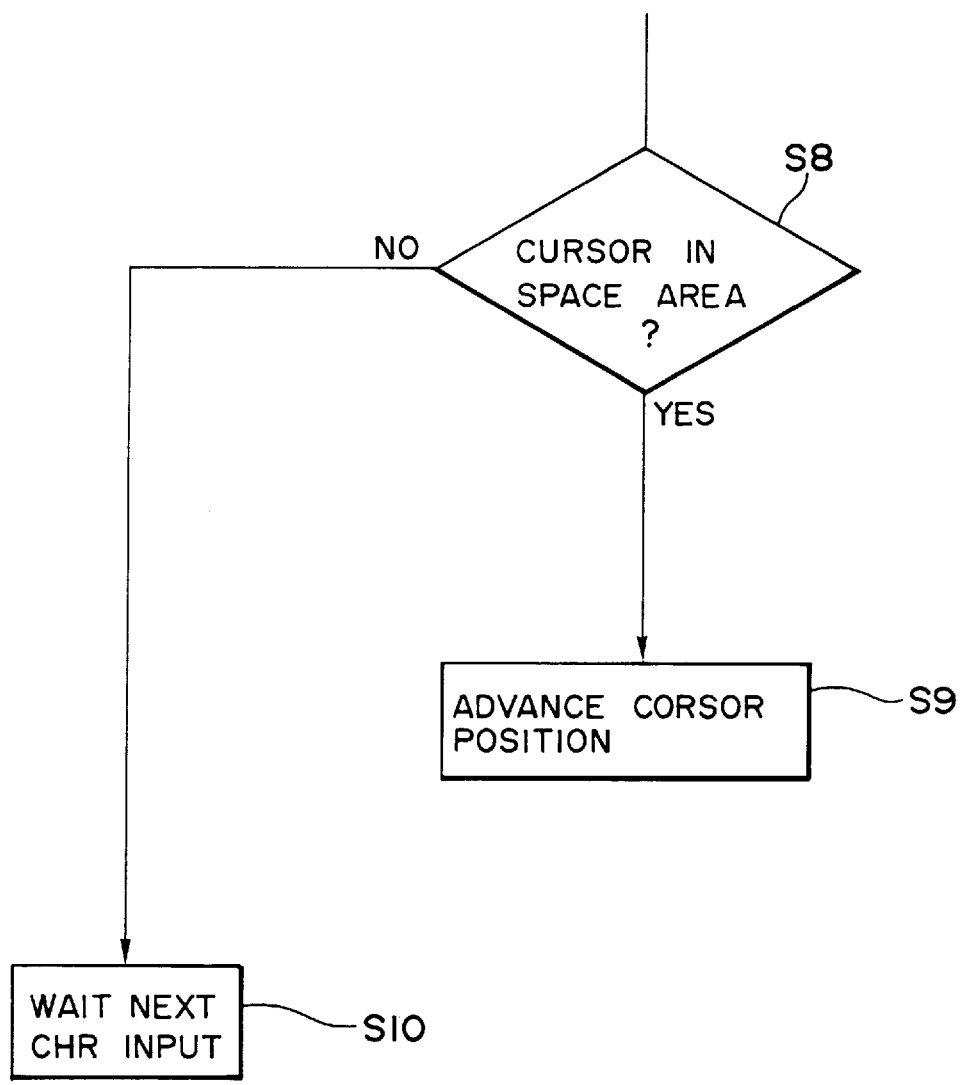
FIG. 8 is a flow chart showing a control sequence of cursor movement of the embodiment of the present invention.

A ROM (read-only memory) 13 stores a control sequence to be described later with reference to FIGS. 6 and 8, and also stores various processing sequences, e.g., character processing. A controller 14 controls the ROM 13 and the CHR generator 12.

A RAM (random access memory) 15 temporarily stores various data. More specifically, the RAM 15 stores a character string input at the keyboard 5 or stores conversion results of kana-kanji conversion in a Japanese document processing apparatus together with format data such as margins, tabs, indentations and print control codes. A RAM 16 stores image data obtained by an image reader 23. Data such as print data read out from the image reader 23, i.e., data associated with the size of a recording paper sheet, data of characters, lines, figures, or the like which are already printed on the recording paper sheet are stored in the RAM 16 in the form of images, and the readout print data are output to the VRAM 10 or a printer 21 under the control of the MPU 1. A controller 17 controls the RAMs 15 and 16, and also controls an interface with the MPU 1.

A floppy disk 18 stores input document data. The floppy disk (FD) 18 is driven by a floppy disk (FD) driver 19 under the control of a controller 20. The printer 21 is controlled by a controller 22.

The image reader 23 reads in the size of a recording paper sheet, already printed characters, lines, and the like. The image reader 23 comprises a photoelectric conversion element array for converting light reflected by a recording paper sheet into an electrical signal, and a moving unit for moving the recording paper sheet.

A controller 24 controls the image reader 23. More specifically, the controller 24 controls reading of a recording paper sheet in accordance with an instruction from the MPU 1, and the read data is stored in the RAM 16 in the form of an image.

Figure 3:
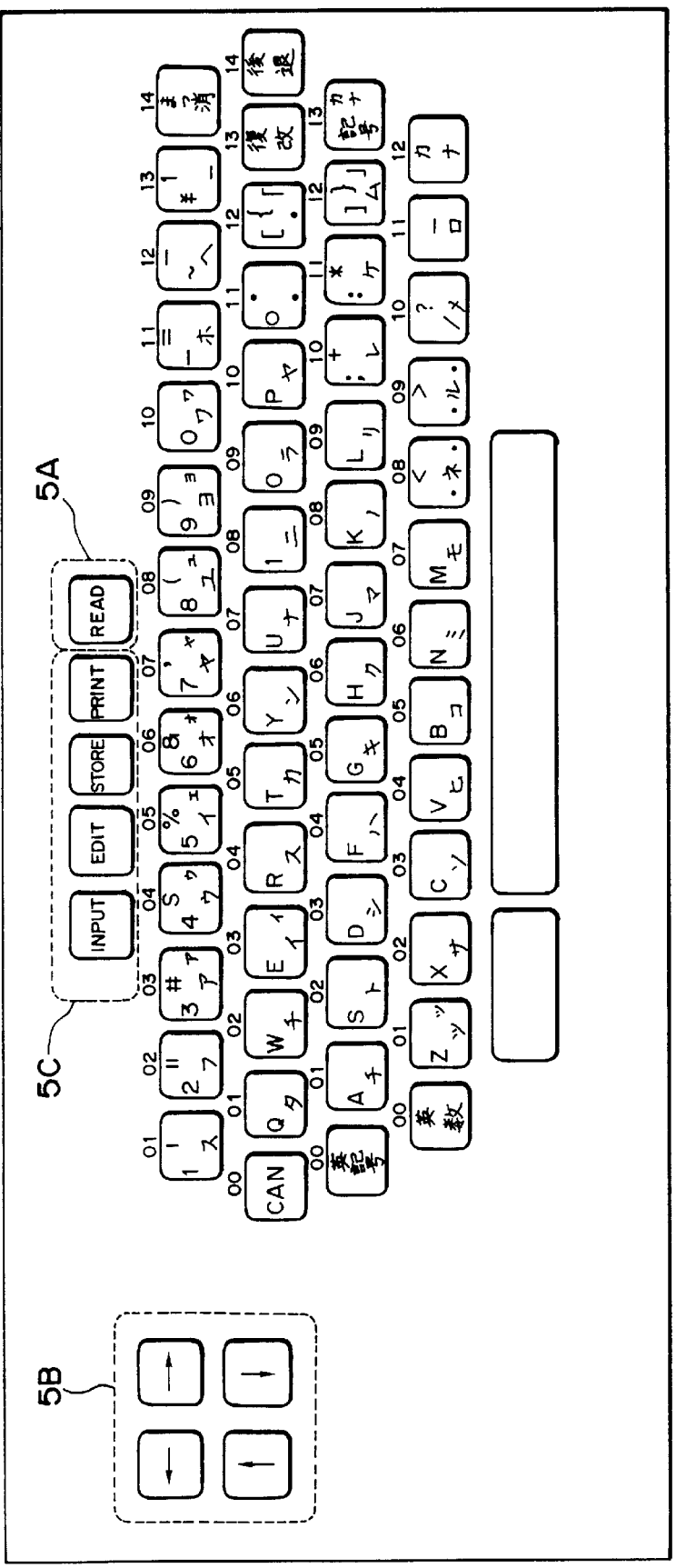
FIG. 3 is a plan view showing an arrangement of a keyboard.

FIG. 3 shows a key arrangement of the keyboard 5. The keyboard 5 shown in FIG. 3 includes a read key 5A, cursor keys 5B, and mode selection keys 5C. When the read key 5A is depressed, the image reader 23 reads a recording paper sheet. A cursor indicating a character input position on a display screen of the CRT display 8 is moved using the cursor keys 5B. The mode selection keys 5C are used to select a processing mode. For example, when a "PRINT" key is depressed, printing processing is executed using the printer 21.

FIG. 4 shows an example of a recording paper sheet, and exemplifies a personal history on which characters, symbols, frames, and the like are printed in advance. The blanks of the recording paper sheet shown in FIG. 4 are filled using the apparatus of the present invention. The recording paper sheet shown in FIG. 4 is placed on the image reader 23, and the read key 5A on the keyboard 5 is depressed. Thus, the size of the recording paper sheet, and print data such as characters, symbols, frames, and the like are read in, and are stored in the RAM 16.

Figure 5:
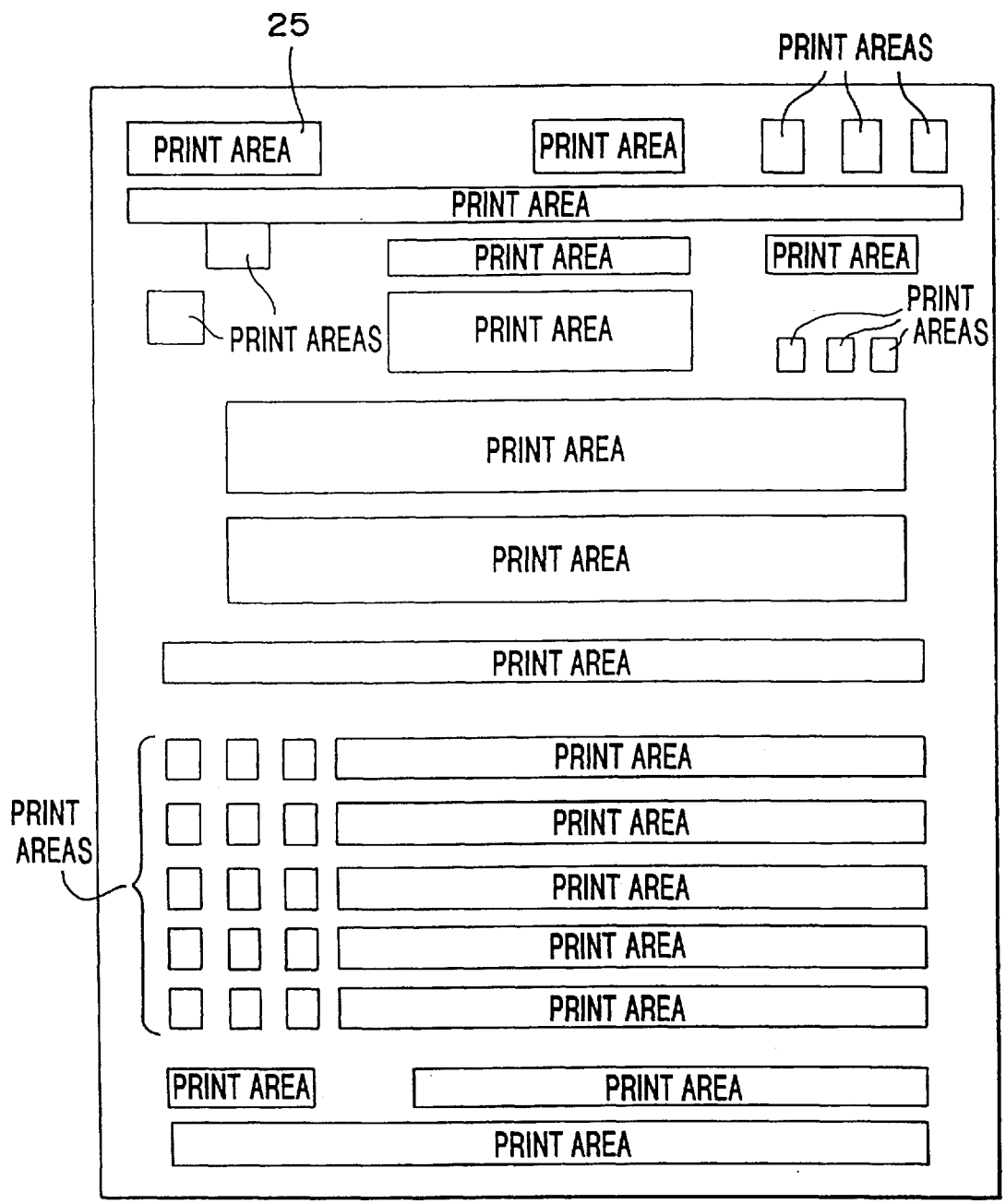
FIG. 5 is a plan view showing a print area according to the embodiment of the present invention.

FIG. 5 shows print areas which are set based on the size of the recording paper sheet and the content of the print data shown in FIG. 4. For example, a portion surrounded by a frame as indicated by reference numeral 25 in FIG. 5 is a print area. This area is a portion excluding a portion on which characters, symbols, frames, lines, and the like in FIG. 4 are printed. Whether or not a printing operation is enabled at the keyboard is determined by the MPU 1, and the determination result is stored in the RAM 15 as a document format. FIG. 6 shows a control flow of the above-mentioned operation.

Figure 6:
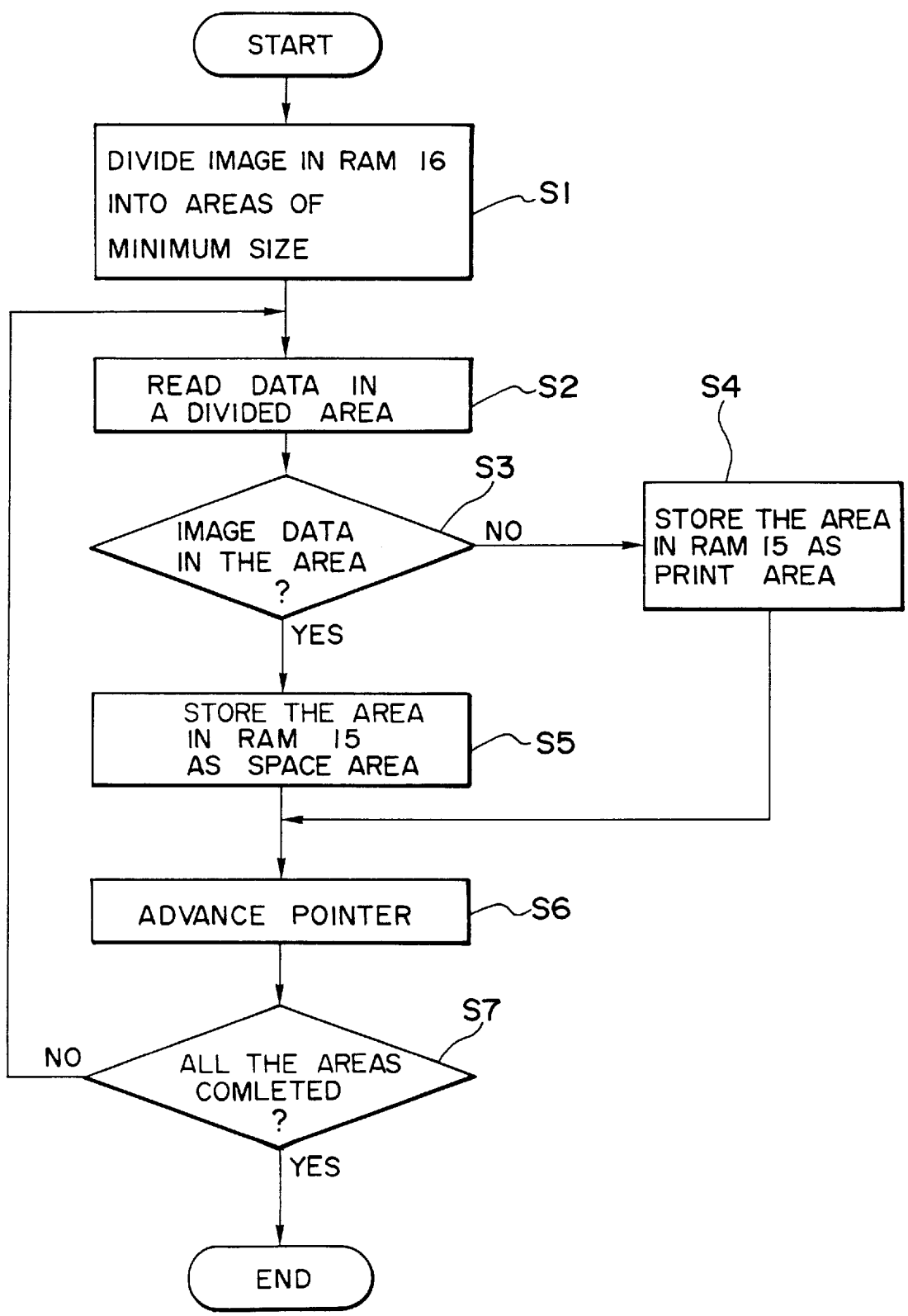
FIG. 6 is a flow chart showing a control sequence of the embodiment of the present invention.

In FIG. 6, the content of image data read in from the image reader 23 and stored in the RAM 16 is divided into areas each corresponding to a minimum print character size, in step S1.

In step S2, the content in an area of one minimum print character is read out from the RAM 16.

In step S3, it is checked whether or not part of characters, frames, ruled lines, symbols, and the like already printed on the recording paper sheet are present in one print character area.

If it is determined in step S3 that the area is blank, i.e., no data is printed in the print character area, the flow advances to step S4, and the area is registered in the RAM 15 as a print area.

If it is determined in step S3 that data is printed in the print character area, since no further data can be input in this area, the area is stored as a space area in the RAM 15 (step S5).

If data is stored in the RAM 15 in step S4 or S5, the flow advances to step S6, and a pointer is advanced to the next minimum print character area.

In step S7, it is checked whether or not all the print areas on the recording paper sheet are checked. If YES in step S7, the flow ends; otherwise, the flow returns to step S2 to check the content in the next print area.

FIG. 7 shows a case wherein new characters are displayed on the already printed recording paper sheet shown in FIG. 4 on the display screen of the CRT display 8. In FIG. 7, a cursor 26 indicates a next position where a character can be input. Movement of the cursor in the print area is indicated by numerals 27, 28, and 29.

As can be seen from FIG. 5, at the cursor position 27, data can be printed. When the cursor is advanced from the position 27 using one of the cursor keys 5B, the cursor is moved to the position 28. When the cursor key 5B is kept depressed, a print input cannot be performed at a position on the right side of the cursor position 28 since this position is already stored in the RAM 15 as the space area, and when the cursor is further moved to the right, it enters the print area at the position 29. More specifically, when an operator depresses the cursor key 5B at the position 28, the cursor is advanced to the position 29. FIG. 8 shows the flow chart of this control.

More specifically, it is checked in step S8 if the cursor position is in the space area.

If YES in step S8, the flow advances to step S9, and the cursor position is advanced.

However, if NO in step S8, the flow advances to step S10, and the apparatus awaits the input of a next character.

FIG. 9 shows an example wherein only characters are input in the print areas of a blank recording paper sheet in accordance with the document format shown in FIG. 7.

In the above embodiment, a printing operation on a recording paper sheet on which data is printed in advance has been exemplified. According to the present invention, if the document processing apparatus comprises a reading unit having high resolution and a printing unit, new input characters and the like can be printed on a blank paper sheet together with already printed characters, ruled lines, figures, and the like read by the reading unit. For this purpose, the contents of the RAMs 15 and 16 are synthesized and the synthesized data can be transferred to the printer 21.

Image data read by the image reader 23 need not be directly stored in the RAM 16. For example, the image data is subjected to character recognition, graphic processing, and the like, so that characters, figures, and the like are converted to different ones and are stored in the RAM 16 while the already printed format remains the same, thus obtaining a higher-quality document.

In the embodiment shown in FIG. 7, already printed characters and new input characters are displayed in the same format. However, when the content of the RAM 16 is written in the VRAM 10, the new input characters can be displayed by reversing, decreasing luminance, designating a color, and the like, so that the already printed portion and a new input portion are displayed in different formats. Thus, an operator can easily discriminate the input characters from the printed characters.

In this embodiment, the already printed portion is converted to a space area. However, in place of the space area, the already printed portion can be substituted with a print control code, e.g., a tab, indentation, margin, or the like to skip the already printed portion.

Figure 10A:
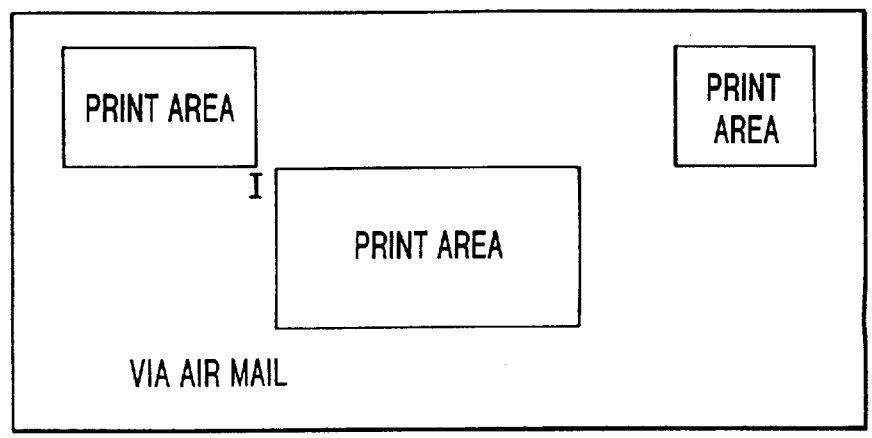
FIGS. 10(A) and 10(B) are plan views showing cases wherein recording areas are surrounded by frames.
Figure 10B:
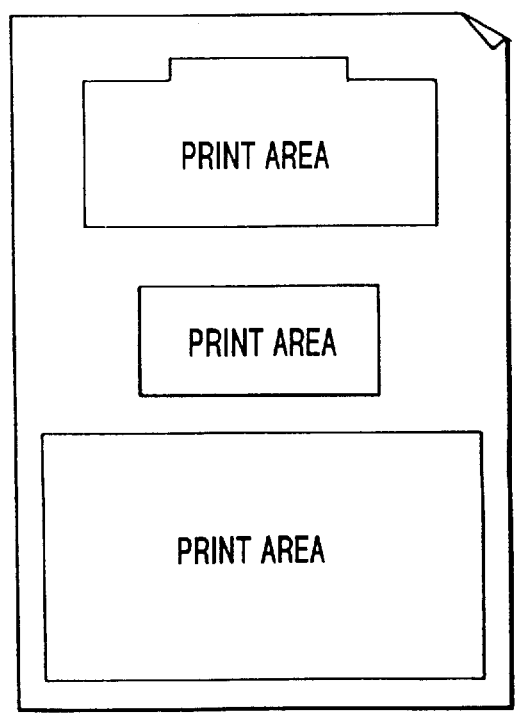

FIGS. 10(A) and 10(B) show a case wherein a recording paper sheet on which a format is surrounded by frames in advance is separately read by the image reader. In FIG. 10(A), letters "VIA AIR MAIL" are printed in advance, and a recording paper sheet on which frames are printed is read by the image reader, so that characters are automatically printed in the frames. In FIG. 10(B), a blank recording sheet on which frames are printed is read by the image reader, so that predetermined characters are automatically printed in the frames. In this case, a format such as margins, tabs, and indentations need not be set, and characters can be automatically input in areas to be printed.

As described above, according to the present invention, print data on a recording material is read, a print area is set based on the read content, and characters are input in this print area. Thus, a printing operation can be performed according to a complicated document format with a very simple operation.

According to the present invention, in a normal edit printing operation, a format such as margins, tabs, indentations, and the like need not be set, and operation errors can be eliminated.

If the printer comprises a page printer such as a laser beam printer, blanks can be filled in on a screen, and a document processing apparatus which is easy to use can be realized.

What is claimed is:

1. A document processing apparatus comprising:

first storage means for storing image data read by an image reader;

recognition means for recognizing, based on the image data stored in said first storage means, a printable area in which character data can be inputted by an input device;

second storage means for storing character data inputted by the input device;

processing means for executing a figure processing operation on the image data stored in said first storage means;

print means for printing data based on the image data processing by said processing means and the character data stored in said second storage means such that the character data is printed in the printable area recognized by said recognition means; and display means for displaying an area at which the image data is printed and the printable area in respective different conditions.

2. A document processing apparatus comprising:

input means for inputting character information at a position on a display screen, the position being indicated by a cursor;

read means for reading print information printed on a recording medium;

setting means for, in response to the print information read by said read means, setting an area of the recording medium in which information has been printed as a non-printable area and an area of the recording medium in which no information has been printed as a printable area;

display control means for controlling the displaying of the printable area and the non-printable area in respective different conditions on the display screen;

control means for controlling the cursor to move in the printable area set by said setting means and to not move into the non-printable area set by said setting means;

memory means for storing the character information input by said input means at a position indicated by the cursor controlled by said control means; and print means for printing information based on the character information stored in said memory means.

3. An apparatus according to claim 2, wherein said print means prints the information together with the print information read by said read means.

4. An apparatus according to claim 2, wherein said print means prints the information together with information obtained by figure-processing the print information read by said read means.

5. An apparatus according to claim 2, wherein said setting means divides the recording medium into areas having a minimum character size and sets each of the divided areas in which information has been printed as a non-printable area.

6. An apparatus according to claim 2, further comprising display means for displaying information based on the print information read by said read means.

7. An apparatus according to claim 2, wherein said input means comprises a keyboard.

8. A document processing method comprising the steps of:

inputting character information at a position on a display screen, the position being indicated by a cursor;

reading print information printed on a recording medium;

setting an area of the recording medium in which information has been printed as a non-printable area and setting an area of the recording medium in which no information has been printed as a printable area, in response to the reading of the print information read in said reading step;

controlling the displaying of the printable area and the non-printable area in respective different conditions on the display screen;

controlling the cursor to move in the printable area set by said setting step and to not move into the nonprintable area set by said setting step;

storing the character information input by said input step at a position indicated by the cursor controlled by said controlling step; and printing information based on the character information stored in said storing step.

9. A method according to claim 8, wherein said printing step prints the information together with the print information read by said reading step.

10. A method according to claim 8, wherein said printing step prints the information together with information obtained by figure-processing the print information read by said reading step.

11. A method according to claim 8, wherein said setting step divides the recording medium into areas having a minimum character size and sets each of the divided areas in which information has been printed as a non-printable area.

12. A method according to claim 8, further comprising the step of displaying information based on the print information read by said reading step.

13. A method according to claim 8, wherein said inputting step inputs the character information with a keyboard.

14. A computer usable medium having computer readable program code means embodied in the medium for causing a computer to process a document, said computer readable program code means comprising:

first computer readable program code means for causing the inputting of character information into the computer at a position on a display screen, the position being indicated by a cursor;

second computer readable program code means for causing the computer to read print information printed on a recording medium;

third computer readable program code means for causing the computer to set an area of the recording medium in which information has been printed as a non-printable area and setting an area of the recording medium in which no information has been printed as a printable area, in response to the reading of the print information caused by said second computer readable program code means;

fourth computer readable program code means for causing the computer to control the cursor to move in the printable area caused to be set by said third computer readable program code means and for causing the computer to control the cursor to not move into the nonprintable area caused to be set by said third computer readable program code means;

fifth computer readable program code means for causing the computer to store the character information input by said input step at a position indicated by the cursor caused to be controlled by said fourth computer readable program code means;

sixth computer readable program code means for causing the computer to print information based on the character information caused to be stored by said fifth computer readable program code means; and seventh computer readable program code means for causing the computer to control the displaying of the printable area and the non-printable area in respective different conditions on the display screen.

15. A medium according to claim 14, wherein said sixth computer readable program code means causes the computer to print the information together with the print information caused to be read by said second computer readable program code means.

16. A medium according to claim 14, wherein said sixth computer readable program code means causes the computer to print the information together with information obtained by figure-processing the print information caused to be read by said second computer readable program code means.

17. A medium according to claim 14, wherein said third computer readable program code means causes the computer to divide the recording medium into areas having a minimum character size and causes the computer to set each of the divided areas in which information has been printed as a non-printable area.

18. A medium according to claim 14, further comprising seventh computer readable program code means for causing the computer to display information based on the print information caused to be read by said second computer readable program code means.

19. A medium according to claim 14, wherein said first computer readable program code means causes the computer to receive inputted the character information with a keyboard.

20. A document processing apparatus comprising:

first memory means for storing a character entered by input means;

second memory means for storing an image recorded on a recording medium and read by reading means;

area determination means for performing an analysis on the image stored in said second memory means and for determining a printable area in response to the analysis;

control means for controlling a cursor on a display screen of display means to move in the printable area determined by said area determination means, the cursor being indicative of a position on the display screen at which a character is to be entered by the input means; and display control means for controlling the display means to display the image stored in said second memory means and the character stored in said first memory means in respective different conditions on the display screen.

21. An apparatus according to claim 20, further comprising print control means for controlling print means to print the character stored in said first memory means.

22. An apparatus according to claim 20, further comprising print control means for combining the image stored in said second memory means and the character stored in said first memory means to produce a combined data and for controlling print means to print the combined data.

23. An apparatus according to claim 20, further comprising:

recognition means for performing a figure recognition on the image stored in said second memory means; and print control means for combining a figure obtained through the figure recognition performed by said recognition means and the character stored in said first memory means to produce combined data and for controlling print means to print the combined data.

24. An apparatus according to claim 20, wherein said area determination means determines the printable area based on a minimum character size.

25. A document processing method comprising:

a first memory step for storing a character entered by input means;

a second memory step for storing an image recorded on a recording medium and read by reading means;

an area determination step for performing an analysis on the image stored in said second memory step and for determining a printable area in response to the analysis;

a control step for controlling a cursor on a display screen of display means to move in the printable area determined by said area determination step, the cursor being indicative of a position on the display screen at which a character is to be entered by the input means; and a display control step for controlling the display means to display the image stored in said second memory step and the character stored in said first memory step in respective different conditions on the display screen.

26. A method according to claim 25, further comprising a print control step for controlling print means to print the character stored in said first memory step.

27. A method according to claim 25, further comprising a print control step for combining the image stored in said second memory step and the character stored in said first memory step to produce combined data and for controlling print means to print the combined data.

28. A method according to claim 25, further comprising:

a recognition step for performing a figure recognition on the image stored in said second memory step; and a print control step for combining a figure obtained through the figure recognition performed by said recognition step and the character stored in said first memory step to produce combined data and for controlling print means to print the combined data.

29. A method according to claim 25, wherein said area determination step determines the printable area based on a minimum character size.

30. A computer usable medium having computer readable program code means embodied in the medium for causing a computer to process a document, said computer readable program code means comprising:

first computer readable program code means for causing the computer to store a character entered by input means;

second computer readable program code means for causing the computer to store an image recorded on a recording medium and read by reading means;

third computer readable program code means for causing the computer to perform an analysis on the image caused to be stored by said second computer readable program code means and for determining a printable area in response to the analysis;

fourth computer readable program code means for causing the computer to control a cursor on a display screen of display means to move in the printable area caused to be determined by third computer readable program code means, the cursor being indicative of a position on the display screen at which a character is to be entered by the input means; and fifth computer readable program code means for causing the computer to control the display means to display the image caused to be stored by said second computer readable program code means and the character caused to be stored by said first computer readable program code means in respective different conditions on the display screen.

31. A computer usable medium according to claim 30, further comprising print control means for controlling print means to print the character caused to be stored by said first computer readable program code means.

32. A computer usable medium according to claim 30, further comprising print control means for combining the image stored caused to be stored by said second computer readable program code means and the character caused to be stored by said firs computer readable program code means to produce combined data and for causing the computer to control print means to print the combined data.

33. A computer usable medium according to claim 30, further comprising:

sixth computer readable program code means for causing the computer to perform figure recognition on the image caused to be stored by said second computer readable program code means; and seventh computer readable program code means for causing the computer to combine a figure obtained through the figure recognition caused to be performed by said sixth computer readable program code means and the character caused to be stored by said first computer readable program code means to produce combined data and for causing the computer to control print means to print the combined data.

34. A computer usable medium according to claim 30, wherein said third computer readable program code means causes the computer to determine the printable area based on a minimum character size.

* * * * *

UNITED STATES PATENT AND TRADEMARK OFFICE
CERTIFICATE OF CORRECTION

PATENT NO. : 5,878,200

DATED : March 2, 1999

INVENTOR(S) : HIDESHI ICHIMURA

Page 1 of 2

It is certified that error appears in the above-identified patent and that said Letters Patent is hereby corrected as shown below:

<u>COVER PAGE At [56], References Cited</u>
"Jackson" should read --Jackson et al.--".
"Furusawa" should read --Furusawa et al.--.
"Kolpek" should read --Kolpek et al.--.
"Smutek" should read --Sumtek et al.--.
"4,491,933 1/1985 Wisin et al." should read
   --4,491,933 1/1985 Ursin et al.--.
"Masaki" should read --Masaki et al.--.
"DeGeorge" should read --DeGeorge et al.--.
"Carlson" should read --Carlson et al.--.
"Woods" should read --Woods et al.--.
"Hirosawa" should read --Hirosawa et al.--.
"Kimura" should read --Kimura et al.--.

<u>COLUMN 8,</u>
Line 17, "inputted the character information" should read
--the inputted character information inputted--.

UNITED STATES PATENT AND TRADEMARK OFFICE
CERTIFICATE OF CORRECTION

PATENT NO. : 5,878,200

DATED : March 2, 1999

INVENTOR(S) : HIDESHI ICHIMURA

It is certified that error appears in the above-identified patent and that said Letters Patent is hereby corrected as shown below:

SHEET 6 OF THE DRAWINGS
"COMLETED" should read --COMPLETED--.

Signed and Sealed this

Twenty-fourth Day of August, 1999

Attest:

Q. TODD DICKINSON

Attesting Officer

Acting Commissioner of Patents and Trademarks